(12) United States Patent
Chaturvedi et al.

(10) Patent No.: US 7,419,745 B2
(45) Date of Patent: Sep. 2, 2008

(54) METHOD OF FORMING AN ELECTRODE STRUCTURE USEFUL IN ENERGY STORAGE DEVICES

(76) Inventors: Sanjay Chaturvedi, 1116 Highpoint Cir., Lansdale, PA (US) 19446; William Joseph Grieco, 756 Daniel Dr., Collegeville, PA (US) 19426; Eric Gustave Lundquist, 107 Churchill Cir., North Wales, PA (US) 19454

( * ) Notice: Subject to any disclaimer, the term of this patent is extended or adjusted under 35 U.S.C. 154(b) by 535 days.

(21) Appl. No.: 11/053,825

(22) Filed: Feb. 9, 2005

(65) Prior Publication Data

US 2005/0220989 A1 Oct. 6, 2005

Related U.S. Application Data

(60) Provisional application No. 60/558,049, filed on Mar. 31, 2004.

(51) Int. Cl.
*H01M 4/58* (2006.01)

(52) U.S. Cl. .................. 429/231.8; 429/217; 429/232; 429/233; 429/209; 429/245; 427/122; 427/384; 427/421.1; 427/422; 427/427.5

(58) Field of Classification Search .............. 429/231.8, 429/217, 232, 233, 209, 122, 245; 427/122, 427/384, 427, 421.1, 422, 427.5
See application file for complete search history.

(56) References Cited

U.S. PATENT DOCUMENTS

| | | | |
|---|---|---|---|
| 3,899,354 A * | 8/1975 | Kordesch | .................. 29/623.1 |
| 4,633,372 A | 12/1986 | Calahan et al. | |
| 5,150,283 A | 9/1992 | Yoshida et al. | |
| 5,657,522 A * | 8/1997 | Figueira et al. | ............. 429/211 |
| 5,993,996 A | 11/1999 | Firsich | |
| 6,072,692 A * | 6/2000 | Hiratsuka et al. | .......... 29/25.03 |
| 6,297,293 B1 | 10/2001 | Bell et al. | |
| 6,316,143 B1 | 11/2001 | Foster et al. | |
| 6,328,770 B1 | 12/2001 | Gozdz | |
| 6,426,863 B1 | 7/2002 | Munshi | |
| 6,449,139 B1 | 9/2002 | Farahmandi et al. | |
| 6,455,109 B1 | 9/2002 | Yasumoto et al. | |
| 6,565,701 B1 | 5/2003 | Jerabek et al. | |
| 6,627,252 B1 | 9/2003 | Nanjundiah et al. | |
| 6,737,445 B2 | 5/2004 | Bell et al. | |
| 2003/0026063 A1 | 2/2003 | Munshi | |
| 2003/0099884 A1 | 5/2003 | Chiang et al. | |
| 2003/0110607 A1 | 6/2003 | Bendale et al. | |
| 2004/0247872 A1 * | 12/2004 | Sudo et al. | ............. 428/402.24 |

FOREIGN PATENT DOCUMENTS

| | | |
|---|---|---|
| EP | 0 948 071 A | 10/1999 |
| JP | 04-154106 A | 5/1992 |
| JP | 05-304050 A | 11/1993 |
| JP | 09-036005 A | 2/1997 |
| JP | 2004-072016 A | 3/2004 |

* cited by examiner

*Primary Examiner*—Laura S Weiner
(74) *Attorney, Agent, or Firm*—Thomas S. Deibert

(57) ABSTRACT

The present invention relates to a method for forming an electrode structure useful in energy storage devices, which method involves the spray deposition of a mixture of carbon and a binder on a current collector. In addition, the present invention relates to energy storage devices including an electrode structure produced using a spray deposition method to deposit a mixture of carbon and a binder on a current collector.

10 Claims, No Drawings

METHOD OF FORMING AN ELECTRODE STRUCTURE USEFUL IN ENERGY STORAGE DEVICES

CROSS REFERENCE TO RELATED PATENT APPLICATIONS

This is a non-provisional application of prior U.S. provisional application Ser. No. 60/558,049 filed Mar. 31, 2004.

The present invention relates to a method for forming an electrode structure. More specifically, the present invention relates to a method for forming an electrode structure for use in an energy storage device.

Electrode structures for energy storage devices are conventionally prepared from a slurry containing a carbonaceous material in powder form, a binder and a solvent. This slurry is typically coated on a metal foil current collector using a knife blading process to provide a thin, even coating of the slurry on the current collector. The coated current collector is then dried in an oven to remove the solvent and to cure the binder. The electrode structure may then, optionally, be calendered to densify the electrochemically active material coated onto the current collector by decreasing the volume or packing fraction of the electrochemically active material, reducing the overall porosity of the electrode structure.

There are a variety of disadvantages associated with such conventional methods of forming electrode assemblies relating to the use of solvents in the process. For example, the use of solvents in these conventional methods may result in environmental concerns related to the release of volatile organic compounds (VOCs) into the environment; added costs associated with the use of such solvents including the added energy costs resulting from the increased oven drying times needed to insure sufficient removal of the solvent from the electrode structure.

One attempt to overcome the disadvantages associated with conventional electrode assembly methods is disclosed in U.S. Pat. No. 5,993,996 to Firsich. Firsich discloses, inter alia, the formation of a carbon electrode monolith by spray coating a carbonizable binder and carbonizable polymer precursor onto a removable backing material. The spray coated material may be removed from the backing material before or after carbonization. The carbonized material may be activated and functionalized via subsequent acid treatment. It would be desirable, however, to have a method for depositing an activated carbon material directly onto a current collector, which does not require subsequent carbonization as disclosed by Firsich and which minimizes or eliminates the need for solvents.

In one aspect of the present invention, there is provided a method of forming an electrode structure, including: (a) depositing a porous electrode on a current collector by spraying onto the current collector a mixture containing: (i) a carbon; (ii) a binder; and, optionally, (iii) an electrically conductive additive; (b) heating the product of (a) to cure the binder; and, optionally, (c) calendering the product of (b).

In another aspect of the present invention, there is provided a method of forming an electrode structure, including: (a) depositing a porous electrode on a current collector by electrostatic spray depositing onto the current collector a mixture containing: (i) a carbon; (ii) a binder; and, optionally, (iii) an electrically conductive additive; (b) heating the product of (a) to cure the binder; and, optionally, (c) calendering the product of (b).

In another aspect of the present invention, there is provided a method of forming an electrode structure, including: (a) pretreating a current collector to modify its surface energy; (b) depositing a porous electrode on the modified current collector by spraying onto the current collector a mixture including: (i) a carbon; (ii) a binder; and, optionally, (iii) an electrically conductive additive; (b) heating the product of (a) to cure the binder; and, optionally, (c) calendering the product of (b).

In another aspect of the present invention, there is provided a long life double layer capacitor, including: (a) at least two electrode structures prepared by a method of the present invention; (b) at least one porous separator interposed between the at least two electrode structures and (c) an electrolytic solution in contact with the at least two electrode structures and the at least one porous separator.

In another aspect of the present invention, there is provided an energy storage device containing an electrode structure prepared by a method of the present invention.

In another aspect of the present invention, there is provided a use of an energy storage device of the present invention in a variety of systems, including: an automobile, power quality system, engine starting system, energy storage system for a photovoltaic cell, energy storage system for a windmill, medical system, mobile propulsion system, military electronics system, transportation system, commercial electronics system, consumer electronics system, portable electronics system, audio system and consumer appliance.

The use of the deposition methods of the present invention use materials that are both user and environmentally friendly. The need for harmful fugitive organic solvent carriers, utilized in conventional liquid coating application methods, is virtually eliminated. Accordingly, the deposition methods of the present invention result in the emission of little, if any, volatile materials into the environment; thereby, alleviating both the air pollution and health concerns associated with such volatile materials. Moreover, the methods of the present invention exhibit very high coating efficiencies based at least in part on the ready recyclability of oversprayed material. For example, in one embodiment of the present invention, as least 75 wt % of the sprayed powder; alternatively at least 85 wt % of the sprayed powder, is transferred to the current collector and remains thereon. The remaining powder may readily be recovered and recycled at a rate of 90 wt % or higher.

Deposition techniques suitable for use with the present invention include, for example, powder flame spraying, flame spray pyrolysis, combustion chemical vapor deposition, high velocity oxy-fuel spraying, air plasma spraying, electrostatic spraying, arc spraying and fluidized dipping. In one embodiment of the present invention, electrostatic spray deposition techniques are used. In one aspect of this embodiment, a mixture of finely ground carbon and binder are imparted with an electrostatic charge and propelled onto a current collector. In another aspect of this embodiment, a standard negative corona electrostatic spray gun may be used to deposit the mixture of carbon and binder on a current collector that is connected to an earth ground. An example of such a spray gun is a VersaSprayII commercially available from Nordson Corporation of Amherst, Ohio.

The sprayed mixture of carbon, binder and, optionally, electrically conductive additive is cured by, for example, conductive, convective, radiative, inductive thermal energy, electromagnetic radiative energy or a combination thereof. In one embodiment, the sprayed mixture of carbon, binder and, optionally, electrically conductive additive is heated to a temperature that is above the glass transition temperature of the binder, but below the decomposition temperature of the binder for a period of 2 to 120 minutes; alternatively 2 to 60 minutes; alternatively 2 to 30 minutes.

The method of the invention may optionally include a current collector pre-treatment operation. For example, the current collector can be subjected to a surface treatment to modify its surface energy to promote its wettability and/or its adhesion properties.

Current collector, surface pre-treatment operations suitable for use with the present invention include, for example, corona etching, mechanical abrasion, chemical etching, thermal treatment and chemical treatment.

In one embodiment, the porous electrodes deposited by the methods of the present invention exhibit an average cured thickness of between 25 and 500 μm; alternatively between 50 and 250 μm; alternatively between 50 and 150 μm.

In one embodiment, the porous electrodes formed by the methods of the present invention exhibit a uniform thickness that varies by less than 10%; alternatively by less than 5%; alternatively by less than 2%; alternatively by less than 1%.

Current collectors suitable for use in the electrode structures of the present invention may be made of virtually any electrical conductor. Those skilled in the art will know to select an appropriate material of construction for the current collector for a given application. For example, one skilled in the art will recognize that current collectors for an electrode structure to be incorporated into a double layer ultracapacitor should be made of an electrically conductive material that exhibits electrochemical and chemical corrosion resistance to the electrolytic material to be used in the device. In one embodiment, the current collector may be made from a material selected from aluminum, stainless steel, zinc, titanium, tantalum, copper, gold, nickel or combinations thereof; alternatively a material selected from copper and aluminum; alternatively aluminum.

In one embodiment, the current collector may be in a form including, for example, a foil, a foam metal with a three-dimensional structure, an expanded metal, a net, a mesh, a wool or a combination thereof. In one aspect of this embodiment, the current collector may be made of an aluminum foil.

In one embodiment, the current collectors of the present invention exhibit an average thickness of 5 to 500 μm; alternatively 5 to 100 μm; alternatively 5 to 50 μm.

In one embodiment of the present invention, the mixture of carbon, binder and, optionally, electrically conductive additive may include 50 to 98 wt % carbon; alternatively 50 to 95 wt % carbon; alternatively 50 to 90 wt % carbon, alternatively 50 to 85 wt % carbon, alternatively 50 to 80 wt % carbon.

In one embodiment of the present invention, the mixture of carbon, binder and, optionally, electrically conductive additive may include no more than 50 wt % binder, alternatively 0.5 to 50 wt % binder, alternatively 2 to 50 wt % binder, alternatively less than 15 wt % binder, alternatively 0.5 to 10 wt % binder, alternatively less than 5 wt % binder.

In one embodiment of the present invention, the mixture of carbon, binder and, optionally, electrically conductive additive may include less than or equal to 10 wt % electrically conductive additive; alternatively less than 5 wt % electrically conductive additive; alternatively less than 2 wt % electrically conductive additive.

Carbons suitable for use with the present invention include, for example, activated carbons, macroreticular carbons, carbon nanotubes and fullerenes.

In one embodiment, the carbon is an activated carbon that exhibits a capacitance of greater than 10 F/g.

In another embodiment, the carbon is an activated carbon that exhibits a surface area determined using the Brunauer, Emmett, Teller (BET) method of analysis of at least 50 $m^2/g$, alternatively 50 to 3,000 $m^2/g$, alternatively at least 500 $m^2/g$, alternatively 500 to 2,500 $m^2/g$, alternatively 800 to 2,500 $m^2/g$, alternatively 1,000 to 2,500 $m^2/g$, alternatively 1,300 to 2,500 $m^2/g$, alternatively 1,500 to 2,500 $m^2/g$.

In another embodiment, the carbon is an activated carbon that exhibits a pore volume of greater than 0.1 $cm^3/g$ by nitrogen adsorption techniques.

In another embodiment, the carbon is an activated carbon that exhibits a pore size distribution by the Horvath-Kawazoe (H-K) method with at least one peak between 0.1 and 5.0 nm.

In another embodiment, the carbon exhibits a pore size distribution by the Barrett-Joyner-Halenda (BJH) method with at least one peak between 2.0 nm and 50.0 nm.

In another embodiment, the carbon exhibits a pore size distribution with at least one first distinct peak at a pore size of less than or equal to 2 nm when measured utilizing H-K dv/dlog(W) pore size distribution and at least one second distinct peak, measured utilizing BJH dv/dlog(D) pore size distribution, at a pore size greater than 2 nm, alternatively greater than 3 nm, alternatively greater than 5 nm, alternatively greater than 10 nm, alternatively greater than 12.5 nm.

In another embodiment, the carbon is an activated carbon that exhibits a volumetric mean particle size of less than 50 μm.

In another embodiment, the carbon is an activated carbon that exhibits a distribution of micropores, mesopores and macropores and a BET surface area of at least 500 $m^2/g$, with 10 to 80% of the BET surface area attributable to pores with a diameter of from 1.7 to 10,000 nm.

In another embodiment, the carbon is an activated carbon that exhibits a capacitance of greater than 10 F/g; a BET surface area greater than 50 $m^2/g$, alternatively 50 to 3,000 $m^2/g$, alternatively at least 500 $m^2/g$, alternatively 500 to 2,500 $m^2/g$, alternatively 800 to 2,500 $m^2/g$, alternatively 1,000 to 2,500 $m^2/g$, alternatively 1,300 to 2,500 $m^2/g$, alternatively 1,500 to 2,500 $m^2/g$; a pore volume of greater than 0.1 $cm^3/g$; a pore size distribution with at least one peak between 0.1 and 50 nm and a volumetric mean particle size of less than 50 μm. In one aspect of this embodiment, the carbon is a macroreticular carbonaceous material. In another aspect of this embodiment, the carbon is a powder.

Activated carbons suitable for use with the present invention may be produced from a variety of starting materials including, for example, phenol-formaldehyde polymers, melamine-formaldehyde polymers, resorcinol-formaldehyde polymers, polyaniline, polyacrylonitrile, kynel, rayon, coconut shell, carbohydrate (such as sucrose), pitch, wood and mixtures thereof.

Binder suitable for use with the present invention includes, for example, polyamide, polyester, cellulose ester, methyl cellulose, (meth)acrylates, poly(meth)acrylates, polyethylene, polypropylene, polyvinyl chloride (PVC), polyvinylidene fluoride (PVDF), polyphenylsulfone, polyvinylpyrrolidone, polytetrafluoroethylene (PTFE), expanded polytetrafluoroethylene (ePTFE), ethylene propylene diene monomer (EPDM), high molecular weight polyethylene (UHMWPE), styrenics and combinations thereof. Commercially available binders suitable for use with the present invention include Kynar® 761 and Kynar® 2801 available from Atofina Chemicals of Philadelphia, Pa. One skilled in the art will know to select a binder material suitable for use in a given device including an electrode structure of the present invention. For example, for an electrode structure for use in a double layer, ultracapacitor, one skilled in the art will know to select a binder material that will be compatible with the electrolyte to be used in the device.

In one embodiment, the binder exhibits a volumetric mean particle size of less than or equal to 5 μm. In another embodiment, the binder exhibits a volumetric mean particle size that is no greater than 50% of the volumetric mean particle size exhibited by the carbon.

Electrically conductive additive suitable for use with the present invention includes, for example, carbon black, graphite, titanium oxide, rutehnium oxide and mixtures thereof. In one embodiment, the electrically conductive additive contains conductive carbon. In one aspect of this embodiment, the conductive carbon is carbon black, graphite and mixtures thereof. Commercially available carbon black suitable for use with the present invention includes, for example, ketjen black and acetylene black available from Akzo Nobel and Cabot Corporation, respectively. In another embodiment, the electrically conductive additive exhibits a volumetric mean particle size of less than or equal to 50 µm.

The electrode structures of the present invention may be used in a variety of energy storage devices including, for example, electrical double layer capacitors (also known as ultracapacitors), batteries, fuel cells, power stabilization devices and electrocapacitive deionization devices. Energy storage devices including the electrode structures of the present invention may be used in a variety of systems including, for example, automotive systems, engine starting systems, energy storage systems for photovoltaic cells, energy storage systems for windmills, medical systems, mobile propulsion systems, military electronics systems, transportation systems, commercial electronics systems, consumer electronics systems, portable electronics systems, audio systems and consumer appliances.

In one embodiment, the electrode structures of the present invention may be used in a capacitor. In one aspect of this embodiment, the capacitor is a double layer capacitor that contains at least two electrode structures prepared by a method of the present invention, at least one porous separator interposed between the at least two electrode structures and an electrolytic solution that is in contact with the at least two electrode structures and the at least one porous separator.

Electrolytic solutions suitable for use with the present invention include, for example, organic electrolytic solution and aqueous electrolytic solution. In one embodiment, the electrolytic solution is an organic electrolytic solution. In one aspect of this embodiment, the organic electrolytic solution may be obtained by dissolving an electrolyte into an organic solvent or a mixture of organic solvents.

Organic solvents suitable for use in the electrolytic solutions of the present invention include, for example, electrochemically stable ethylene carbonate; propylene carbonate; butylene carbonate; γ-butyrolactone; sulfolane; sulfolane derivative; 3-methylsulfolane; 1,2-dimethoxyethane; acetonitrile; glutaronitrile; valeronitrile; dimethylformamide; dimethylsulfoxide; tetrahydrofuran; dimethoxyethane; methylformate; dimethyl carbonate; diethyl carbonate; ethyl methyl carbonate and mixtures thereof.

Electrolytes suitable for use with the organic solvents include, for example, a salt having a quarternary onium cation represented by $R_1R_2R_3R_4N^+$ or $R_1R_2R_3R_4P^+$, wherein $R_1$, $R_2$, $R_3$ and $R_4$ are each independently a $C_{1-6}$ alkyl group and an anion selected from, for example, $BF_4^-$, $PF_6^-$, $ClO_4^-$, $CF_3SO_3^-$ and $(SO_2R_5)(SO_2R_6)N^-$, wherein $R_5$ and $R_6$ are each independently a $C_{1-4}$ alkyl group, an alkylene group and collectively a ring structure. In one embodiment, the electrolyte is selected from a group including $(C_2H_5)_4NBF_4$, $(C_2H_5)_3(CH_3)NBF_4$, $(C_2H_5)_4PBF_4$ and $(C_2H_5)_3(CH_3)PBF_4$. In one embodiment, one of the noted salts may be dissolved in an organic solution at a concentration of 0.1 to 2.5 mol/L, alternatively 0.5 to 2 mol/L.

Separators suitable for use with the present invention may be made from, for example, a non-woven fabric of polypropylene fiber, non-woven fabric of glass fiber, synthetic cellulose, natural cellulose or a combination thereof.

Some embodiments of the present invention will now be described in detail in the following Examples. All fractions and percentages set forth below in the Examples are by weight unless otherwise specified.

EXAMPLE 1

Preparation of Electrode Structures

Three different activated carbons were used in examples 1-36.

The carbon identified in Table I as "BP-15" is commercially available as BP-15 from Kuraray Chemical of Japan.

The carbon identified in Table I as "EGL-572" was prepared by milling to a particle size of less than 30 microns the commercially available product Ambersorb™ 572 from Rohm and Haas Company of Philadelphia, Pa.

The carbon identified in Table I as "EGL-923" was prepared by carbonizing at 1,000° C. and then activating under carbon dioxide the commercially available product Amberlite™ XAD-761 from Rohm and Haas Company of Philadelphia, Pa. The macroreticular carbon produced under these conditions was then milled to a particle size of less than 30 microns.

Six different binders were used in examples 1-36.

The binder identified in Table I as "PVDF" is commercially available as Kynar® 711 from Atofina Chemicals of Philadelphia, Pa.

The binder identified in Table I as "PTFE" is commercially available under Fluoro™ C-369 from Shamrock Technologies, Inc. of Dayton, N.J.

The binder identified in Table I as "AP" is an acrylic powder of a 12 wt % poly(butyl acrylate)/88 wt % poly(methyl methacrylate) emulsion polymer prepared by drying to powder form the emulsion polymer described in Example 2.

The binder identified in Table I as "AE" is an acrylic emulsion of an aqueous 12 wt % poly(butyl acrylate)/88 wt % poly(methyl methacrylate) emulsion polymer prepared using the procedure set forth in Example 2.

The binder identified in Table I as Epoxy is commercially available under Araldite® GT 7013 from Ciba Specialty Chemicals of Tarrytown, N.Y.

In each of Examples 2-19 and 27-29, dry powdered activated carbon was mixed with AP in the fractions set forth in Table I.

In each of Examples 20-26 and 30-36, dry powdered activated carbon was mixed with an AE in the fractions set forth in Table I and then dried under vacuum at 60° C. for 24 hours.

In each of Examples 2-36, the mixture of activated carbon and binder was mechanically mixed using a IKA® A11 basic mixer for 30 seconds to 5 minutes.

Three different metals were used as current collectors in Examples 1-36. The current collector material identified in Table I as "Al foil" is commercially available as Diamond Aluminum Foil from Reynolds Consumer Products, a Division of Alco Inc., of Richmond, Va. The current collector material identified in Table I as "Cu foil" is commercially available from Oak Mitsui Company of Hoosick Falls, N.Y. The current collector material identified in Table I as "All-Foils" is aluminum foil commercially available from All-Foils of Cleveland, Ohio.

In each of Examples 1-36, the activated carbon/binder mixture was electrospray deposited on a 75 mm×125 mm piece of the current collector material identified in Table I using a gravity feed VersaSprayII, standard negative corona electrostatic spray gun available from Nordson Corporation of Amherst, Ohio. During the electrospray deposition process, the current collector material was connected to an earth ground, and the control parameters of the electrostatic spray gun were as follows: feed air pressure of 10 psi, nozzle air pressure of 10 psi, and voltage of 100 kV.

The current collectors with the carbon/binder mixture deposited thereon in Examples 1-36 were thermally cured in a Model No. OV-580C-2 convection oven commercially available from Blue M Electric Co. of Blue Island, Ill. The oven was heated to the temperature noted in Table I for each of the respective examples. The current collector with the carbon/binder mixture deposited thereon was then cured in the oven while maintaining the oven temperature at the noted temperature for the period set forth in Table I.

Results for each of Examples 1-36 are provided in Table I. Each example that resulted in the deposition of a uniform porous electrode is identified with a check mark in the "Uniform Porous Electrode" column in Table I. A uniform porous electrode is defined as a uniform layer of carbon/binder that fully covers and adheres to the current collector as determined by visual inspection. Table I also includes an indication of the relative adhesive strength exhibited by the porous electrodes deposited in Examples 9, 10, 15, 20-26 and 30-26 (i.e., for each example resulting in the deposition of a uniform porous electrode). A "1" indicates that the porous electrode exhibited a relatively poor adhesion. A "2" indicates that the porous electrode exhibited a relatively good adhesion. A "3" indicates that the porous electrode exhibited a relatively strong adhesion. The relative adhesive strength of the porous electrodes was determined by manual scraping.

TABLE I

| Example Number | Current Collector | Carbon | Binder Type | Carbon Fraction (wt %) | Binder Fraction (wt %) | Cure Temp (° F.) | Cure Time (min) | Uniform Porous Electrode | Relative Adhesive Strength |
|---|---|---|---|---|---|---|---|---|---|
| 1 | Al foil | EGL-572 | — | 100 | 0 | 450 | 10 | | |
| 2 | | EGL-572 | PVDF | 95 | 5 | 450 | 10 | | |
| 3 | | EGL-572 | PVDF | 95 | 5 | 500 | 15 | | |
| 4 | | EGL-572 | PVDF | 95 | 5 | 450 | 10 | | |
| 5 | | EGL-572 | PVDF | 85 | 15 | 450 | 10 | | |
| 6 | | EGL-572 | PVDF | 85 | 15 | 500 | 15 | | |
| 7 | | EGL-572 | Epoxy | 85 | 15 | 450 | 10 | | |
| 8 | | EGL-572 | PVDF | 85 | 15 | 450 | 5 | | |
| 9 | | EGL-572 | PVDF | 50 | 50 | 450 | 10 | √ | 2 |
| 10 | Cu foil | EGL-572 | PVDF | 50 | 50 | 450 | 10 | √ | 1 |
| 11 | | EGL-923 | PTFE | 50 | 50 | 350 | 10 | | |
| 12 | | EGL-923 | PTFE | 50 | 50 | 500 | 5 | | |
| 13 | | EGL-923 | PVDF | 95 | 5 | 500 | 10 | | |
| 14 | | EGL-923 | PVDF | 85 | 15 | 500 | 10 | | |
| 15 | | EGL-923 | PVDF | 50 | 50 | 500 | 10 | √ | 2 |
| 16 | | EGL-923 | PVDF | 95 | 5 | 500 | 105 | | |
| 17 | | EGL-923 | AP | 50 | 50 | 400 | 15 | | |
| 18 | | EGL-923 | AP | 85 | 15 | 400 | 15 | | |
| 19 | | EGL-923 | AP | 95 | 5 | 400 | 15 | | |
| 20 | | EGL-923 | AE | 50 | 50 | 400 | 15 | √ | 3 |
| 21 | | EGL-923 | AE | 85 | 15 | 400 | 15 | √ | 1 |
| 22 | | EGL-923 | AE | 95 | 5 | 400 | 15 | √ | 1 |
| 23 | | BP-15 | AE | 50 | 50 | 400 | 15 | √ | 3 |
| 24 | | BP-15 | AE | 85 | 15 | 400 | 15 | √ | 1 |
| 25 | | EGL-923 | AE | 50 | 50 | 400 | 15 | √ | 3 |
| 26 | | EGL-923 | AE | 95 | 5 | 400 | 15 | √ | 3 |
| 27 | All-Foils | EGL-923 | AP | 50 | 50 | 400 | 15 | | |
| 28 | | EGL-923 | AP | 85 | 15 | 400 | 15 | | |
| 29 | | EGL-923 | AP | 95 | 5 | 400 | 15 | | |
| 30 | | EGL-923 | AE | 50 | 50 | 400 | 15 | √ | 3 |
| 31 | | EGL-923 | AE | 85 | 15 | 400 | 15 | √ | 1 |
| 32 | | EGL-923 | AE | 95 | 5 | 400 | 15 | √ | 1 |
| 33 | | BP-15 | AE | 50 | 50 | 400 | 15 | √ | 3 |
| 34 | | BP-15 | AE | 85 | 15 | 400 | 15 | √ | 1 |
| 35 | | EGL-923 | AE | 50 | 50 | 400 | 15 | √ | 3 |
| 36 | | EGL-923 | AE | 95 | 5 | 400 | 15 | √ | 3 |

EXAMPLE 2

Preparation of BA/MMA Emulsion Polymer Binder

A polymer composition of 12 wt % poly(butyl acrylate) and 88 wt % poly(methyl methacrylate) was prepared using the following procedure:

(A) to a 5-liter, 4-necked, round bottom flask equipped with a paddle stirrer, heating mantel and a thermometer were added:
  (i) 1267 parts deionized water;
  (ii) 0.20 parts tartaric acid;
  (iii) 0.018 parts ferrous sulfate; and,
  (iv) 17.8 parts of a 28% solution of sodium lauryl sulfate in water;
(B) the contents of the round bottom flask were then heated to 48° C. while sparging with nitrogen;
(C) a first emulsified monomer mix (EMM) was prepared by combining:
  (i) 117.4 parts methyl methacrylate;
  (ii) 16.0 parts butyl acrylate;

(iii) 99.5 parts deionized water; and, (iv) 3.46 parts of a 28% solution of sodium lauryl sulfate in water;

(D) the product of (C) were then emulsified with a high speed mechanical mixer;

(E) the product of (D) was then added to the contents of the round bottom flask;

(F) the reaction temperature of the contents of the round bottom flask was adjusted to 45° C.;

(G) 0.072 parts sodium formaldehyde sulfoxylate dihydrate was dissolved in 3.53 parts deionized water;

(H) the product of (G) was then added to the contents of the round bottom flask;

(I) 0.074 parts t-butyl hydroperoxide and adding 0.074 parts t-butyl hydroperoxide (70% in water) were then added to the contents of the round bottom flask;

(J) a second EMM was then prepared by combining 234.8 parts methyl methacrylate, 32.0 parts butyl acrylate, 144.2 parts deionized water and 1.62 parts of a 28% solution of sodium lauryl sulfate in water;

(K) the product of (J) was then added to the contents of the round bottom flask;

(L) the temperature of the contents of the round bottom flask were then adjusted to 57° C.;

(M) 0.309 parts 28% solution of sodium lauryl sulfate in water and 0.314 parts of 70% tert-butyl hydroperoxide were then added to the contents of the round bottom flask;

(N) a third EMM was then prepared by combining 352.2 parts methyl methacrylate; 48.0 parts butyl acrylate, 193.4 parts deionized water and 2.38 parts of 28% solution of sodium lauryl sulfate;

(O) the product of (N) was then added to the round bottom flask;

(P) the reaction temperature was then adjusted to 52° C.;

(Q) 0.464 parts 28% solution of sodium lauryl sulfate (dissolved in 22.7 parts deionized water) and then 0.460 parts of 70% t-butyl hydroperoxide were added to the contents of the round bottom flask;

(R) a fourth EMM was then prepared by combining:

(i) 469.7 parts methyl methacrylate;

(ii) 64.0 parts butyl acrylate;

(iii) 259.5 parts deionized water; and, (iv) 3.40 parts 28% sodium lauryl sulfate in water;

(S) the product of (R) was then added to the contents of the round bottom flask;

(T) the reaction temperature was then adjusted to 49° C.;

(U) 2.14 parts sodium lauryl sulfate (dissolved in 104.6 parts deionized water) and 2.14 parts potassium persulfate (dissolved in 104.6 parts deionized water) were then added to the contents of the round bottom flask;

(V) 0.213 parts 28% sodium lauryl sulfate (dissolved in 10.4 parts deionized water) and then 0.322 parts of 70% t-butyl hydroperoxide were added to the contents of the round bottom flask;

(W) after 15 minutes, 0.213 parts 28% sodium lauryl sulfate (dissolved in 10.4 parts deionized water) and then 0.322 parts of 70% t-butyl hydroperoxide were then added to the contents of the round bottom flask; and, (X) after 15 minutes, cooling the contents of the round bottom flask to 30° C. to provide the polymer product.

We claim:

1. A method of forming an electrode structure, comprising:

(a) providing a carbon having a surface area determined using the Brunauer, Emmett, Teller (BET) method of 500 to 2,500 $m^2/g$ and a pore size distribution with at least one peak at a pore size of between 0.1 to 5.0 nm measured using the Horvath-Kawazoe method and at least one second peak at a pore size between 2.0 and 50.0 nm measured using the Barrett-Joyner-Halenda method;

(b) providing an aluminum foil current collector;

(c) depositing a porous electrode on a current collector by spraying onto the current collector a mixture comprising:

(i) the carbon; and (ii) a binder;

wherein the mixture is a powder and wherein the mixture comprises 50 to 85 wt % carbon; and, (d) heating the product of (c) to a temperature above a glass transition temperature of the binder for 2 to 120 minutes to cure the binder.

2. The method of claim 1, wherein the mixture further comprises (iii) an electrically conductive additive.

3. The method of claim 1, wherein the porous electrode is deposited on the current collector by an electrostatic spray deposition process.

4. The method of claim 1, further comprising (e) calendering the product of (d).

5. The method of claim 1, further comprising pretreating the current collector to modify its surface energy before depositing the porous electrode.

6. The method of claim 1, wherein the amount of binder in the mixture is in the range of 2 to 50 wt %.

7. The method of claim 1, wherein the volumetric mean particle size of the binder is less than or equal to 5 μm.

8. The method of claim 1, wherein the binder exhibits a volumetric mean particle size of no greater than 50% of the volumetric mean particle size exhibited by the carbon.

9. A method of forming an electrode structure, comprising:

(a) providing a carbon having a surface area determined using the Brunauer, Emmett, Teller (BET) method of 500 to 2,500 $m^2/g$ and a pore size distribution with at least one peak at a pore size of between 0.1 to 5.0 nm measured using the Horvath-Kawazoe method and at least one second peak at a pore size between 2.0 and 50.0 nm measured using the Barrett-Joyner-Halenda method;

(b) providing an aluminum foil current collector;

(c) depositing a porous electrode on the aluminum foil current collector by spraying onto the current collector a mixture comprising:

(i) 50 to 85 wt % of the carbon;

(ii) 0.5 to 50 wt % of a binder; and, (iii) <2 wt % of an electrically conductive additive;

wherein the mixture is a powder; and, (d) heating the product of (c) to a temperature above a glass transition temperature of the binder for 2 to 120 minutes to cure the binder.

10. A method of forming an electrode structure, comprising:

(a) providing a carbon having a surface area determined using the Brunauer, Emmett, Teller (BET) method of 500 to 2,500 $m^2/g$ and a pore size distribution with at least one peak at a pore size of between 0.1 to 5.0 nm measured using the Horvath-Kawazoe method and at least one second peak at a pore size between 2.0 and 50.0 nm measured using the Barrett-Joyner-Halenda method;

(b) providing an aluminum foil current collector;
(c) depositing a porous electrode on the aluminum foil current collector by spraying onto the current collector a mixture consisting essentially of:
   (i) the carbon; and
   (ii) a binder;

wherein the mixture is a powder and wherein the mixture comprises 50 to 85 wt % carbon; and,
(d) heating the product of (c) to a temperature above a glass transition temperature of the binder for 2 to 120 minutes to cure the binder.

* * * * *